United States Patent
Iezawa et al.

(10) Patent No.: US 11,251,727 B2
(45) Date of Patent: Feb. 15, 2022

(54) ELECTRIC MOTOR CONTROL DEVICE (71) Applicant: Mitsubishi Electric Corporation, Tokyo (JP)

(72) Inventors: Masahiro Iezawa, Tokyo (JP); Yasufumi Ogawa, Tokyo (JP); Yoshihiko Kimpara, Tokyo (JP); Daiki Matsuura, Tokyo (JP); Jun Kitagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/961,780

(22) PCT Filed: Apr. 27, 2018

(86) PCT No.: PCT/JP2018/017137
§ 371 (c)(1),
(2) Date: Jul. 13, 2020

(87) PCT Pub. No.: WO2019/207754
PCT Pub. Date: Oct. 31, 2019

(65) Prior Publication Data
US 2021/0067069 A1  Mar. 4, 2021

(51) Int. Cl.
*H02P 6/28* (2016.01)
*H02P 6/06* (2006.01)
(Continued)

(52) U.S. Cl.
CPC ............... *H02P 6/17* (2016.02); *H02P 6/06* (2013.01); *H02P 6/08* (2013.01); *H02P 6/28* (2016.02);
(Continued)

(58) Field of Classification Search
CPC ...... H02P 6/16; H02P 6/28; H02P 6/08; H02P 6/06; H02P 23/14; H02P 29/024; H02P 23/0031; H02P 29/027; H02P 6/17
See application file for complete search history.

(56) References Cited

U.S. PATENT DOCUMENTS 5,796,228 A * 8/1998 Kojima ................... H02P 25/03
                                                    318/605
7,388,346 B2 * 6/2008 Nishimura ............. H02K 19/36
                                                    318/723
(Continued)

FOREIGN PATENT DOCUMENTS

JP      11-075394 A      3/1999
JP      2001-69784 A     3/2001
(Continued)

OTHER PUBLICATIONS

International Search Report for PCT/JP2018/017137 dated Aug. 7, 2018 [PCT/ISA/210].
(Continued)

*Primary Examiner* — Thai T Dinh
(74) *Attorney, Agent, or Firm* — Sughrue Mion, PLLC; Richard C. Turner (57) ABSTRACT

The electric motor control device includes a rotation angle correction amount calculation unit that, based on a rotation angle signal for an alternating current electric motor output from an angle sensor and a current detection signal for the alternating current electric motor output from a detector, calculates a rotation angle correction amount to correct a rotation angle error between the rotation angle signal and a magnetic pole position of the alternating current electric motor, wherein the rotation angle correction amount calculation unit, based on a current detection signal when a short circuit is caused between winding terminals of the alternating current electric motor, calculates at least either one (Continued)

rotation angle correction amount of a direct current component rotation angle correction amount and an alternating current component rotation angle correction amount.

19 Claims, 7 Drawing Sheets

(51) Int. Cl.
 H02P 6/08 (2016.01)
 H02P 6/17 (2016.01)
 H02P 23/00 (2016.01)
 H02P 23/14 (2006.01)
 H02P 29/024 (2016.01)

(52) U.S. Cl.
 CPC .......... *H02P 23/0031* (2013.01); *H02P 23/14* (2013.01); *H02P 29/027* (2013.01); *H02P 2203/01* (2013.01); *H02P 2203/03* (2013.01)

(56) References Cited

U.S. PATENT DOCUMENTS

| | | | | |
|---|---|---|---|---|
| 7,843,154 B2* | 11/2010 | Suzuki | ............. | H02P 21/22 318/400.02 |
| 8,174,220 B2* | 5/2012 | Inoue | ............. | H02P 6/28 318/400.02 |
| 8,198,846 B2* | 6/2012 | Iwasaki | ............. | H02P 21/18 318/400.37 |
| 8,471,506 B2* | 6/2013 | Manabe | ............. | H02P 6/16 318/400.04 |
| 8,796,963 B2* | 8/2014 | Satou | ............. | B62D 5/046 318/400.04 |
| 9,154,065 B2* | 10/2015 | Yamazaki | ............. | H02P 6/32 |
| 2015/0214875 A1* | 7/2015 | Matsui | ............. | H02P 6/15 318/400.13 |

FOREIGN PATENT DOCUMENTS

| | | |
|---|---|---|
| JP | 2013-021843 A | 1/2013 |
| JP | 2015-119565 A | 6/2015 |
| JP | 2016-049006 A | 4/2016 |

OTHER PUBLICATIONS

Communication dated Aug. 24, 2021 from the Japanese Patent Office in Application No. 2020-515421.

\* cited by examiner

FIG.6

ELECTRIC MOTOR CONTROL DEVICE

CROSS REFERENCE TO RELATED APPLICATIONS

This application is a National Stage of International Application No. PCT/JP2018/017137 filed Apr. 27, 2018.

TECHNICAL FIELD

The present application relates to an electric motor control device that carries out a drive control of an alternating current electric motor using an inverter.

BACKGROUND ART

When carrying out a drive control of an alternating current electric motor using an inverter, an angle sensor is used in order to accurately detect a magnetic pole position of a rotor of the alternating current electric motor. However, as a mounting position of the angle sensor is not strictly managed when manufacturing the alternating current electric motor, a rotation angle error generally exists between a phase of induced electromotive force when the alternating current electric motor is not energized (a phase corresponding to a d-axis direction to be described hereafter, hereafter called a magnetic pole position) and a rotation angle signal generated by the angle sensor.

When the rotation angle error is ignored, a current vector supplied from the inverter to the alternating current electric motor cannot be caused to rotate with an intended torque, or with an intended efficiency, in accordance with a rotation of the alternating current electric motor, because of which it is necessary to detect the rotation angle error using some method when the alternating current electric motor is started, or started for the first time, and correct a phase of the rotation angle signal with the detected value as a rotation angle correction amount.

With consideration to the aforementioned point, an electric motor control device wherein a semiconductor switching element of an inverter is controlled with an alternating current electric motor in an idling state, an armature winding provided in a stator of the alternating current electric motor is caused to short-circuit, and the rotation angle error is estimated from a winding current flowing owing to a no-load induced electromotive force generated in the armature winding, is disclosed in, for example, Patent Literature 1.

More specifically, using a method disclosed in Patent Literature 2, that is, an αβ coordinate system having a U-phase of the three-phase winding as a reference, a current in a short short-circuit time is detected, and a rotation angle correction amount is calculated from a current phase at the time in Patent Literature 1.

CITATION LIST

Patent Literature

Patent Literature 1: JP-A-2013-21843
Patent Literature 2: JP-A-11-75394

SUMMARY OF INVENTION

Technical Problem

This kind of electric motor control device is such that an estimated magnetic pole position is calculated based on a rotational angular frequency, a time after a certain time elapses, and a current phase in an αβ coordinate system having a U-phase of a three-phase winding as a reference, and an average rotation angle error between the rotation angle signal and the magnetic pole position (called a "direct current component rotation angle error" in the specification) is calculated. In this way, an existing electric motor control device is such that only a direct current component rotation angle error included in an angle sensor rotation angle signal is considered, and mainly, there is a problem in that an alternating current component of an angle error between a rotation angle signal and a magnetic pole position (called an "alternating current component rotation angle error" in the specification) remains as a rotation angle error.

Also, when calculating a direct current component rotation angle error, an estimated current phase is calculated in an αβ coordinate system having a U-phase of a three-phase winding as a reference, because of which a value of current detected in the αβ coordinate system has to be processed as an alternating current signal. Because of this, there is a problem in that a rotation angle error increases further due to a time delay caused by a filtering process for removing noise from a current detection signal.

Also, as a rotation angle error is calculated using a current that oscillates at a rotational angular frequency at a time after a certain time elapses, a current detection signal that has passed through a filter with a large time constant cannot be used. Because of this, there is a problem in that a current detection signal in which a large amount of current sensor noise is included has to be used, and an error in an estimated magnetic pole position increases.

Furthermore, when an alternating current electric motor rotates at a low speed, an effect of current change due to a voltage drop caused by a coil resistance value of the alternating current electric motor, or a speed fluctuation caused by instability of a rotational speed of the alternating current electric motor, cannot be ignored, because of which there is also a problem in that a rotation angle calculation error increases due to these factors too.

The present application discloses technology for resolving the aforementioned kinds of problem, and has an object of providing an electric motor control device such that a rotation angle correction value used in a phase correction of an angle sensor rotation angle signal can be calculated with high accuracy.

Solution to Problem

An electric motor control device disclosed in the present application includes an electric motor control circuit that controls an inverter that supplies power to an alternating current electric motor, and into which a rotation angle signal for the alternating current electric motor output from an angle sensor and a current detection signal for the alternating current electric motor output from a detector are input, a rotation angle correction amount calculator that, based on the rotation angle signal and the current detection signal, calculates a rotation angle correction amount to correct a rotation angle error between the rotation angle signal and a magnetic pole position of the alternating current electric motor, and a rotation angle corrector that stores the rotation angle correction amount calculated by the rotation angle correction amount calculator, reads the stored rotation angle correction amount, and corrects the rotation angle signal, wherein the control device carries out a control of the alternating current electric motor based on the rotation angle signal corrected by the rotation angle corrector, and the rotation angle correction amount calculator, based on a current detection signal when a short circuit is caused between winding terminals of the alternating current electric motor, calculates at least either one rotation angle correction amount of a direct current component rotation angle correction amount and an alternating current component rotation angle correction amount.

Advantageous Effects of Invention

According to the electric motor control device disclosed in the present application, a direct current component rotation angle correction amount and an alternating current component rotation angle correction amount, or one of a direct current component rotation angle correction amount and an alternating current component rotation angle correction amount, is calculated from current detection signal phase information when a short circuit is caused between winding terminals of an alternating current electric motor, because of which the electric motor control device has an advantage in that a rotation angle correction amount used in correcting a phase of an angle sensor rotation angle signal can be calculated with high accuracy.

Objects, features, aspects, and advantages of the present application other than the aforementioned will become more apparent from the following detailed description, which refers to the drawings.

DESCRIPTION OF EMBODIMENTS

Hereafter, using the drawings, a preferred embodiment of an electric motor control device according to the present application will be described.

First Embodiment

Figure 1:
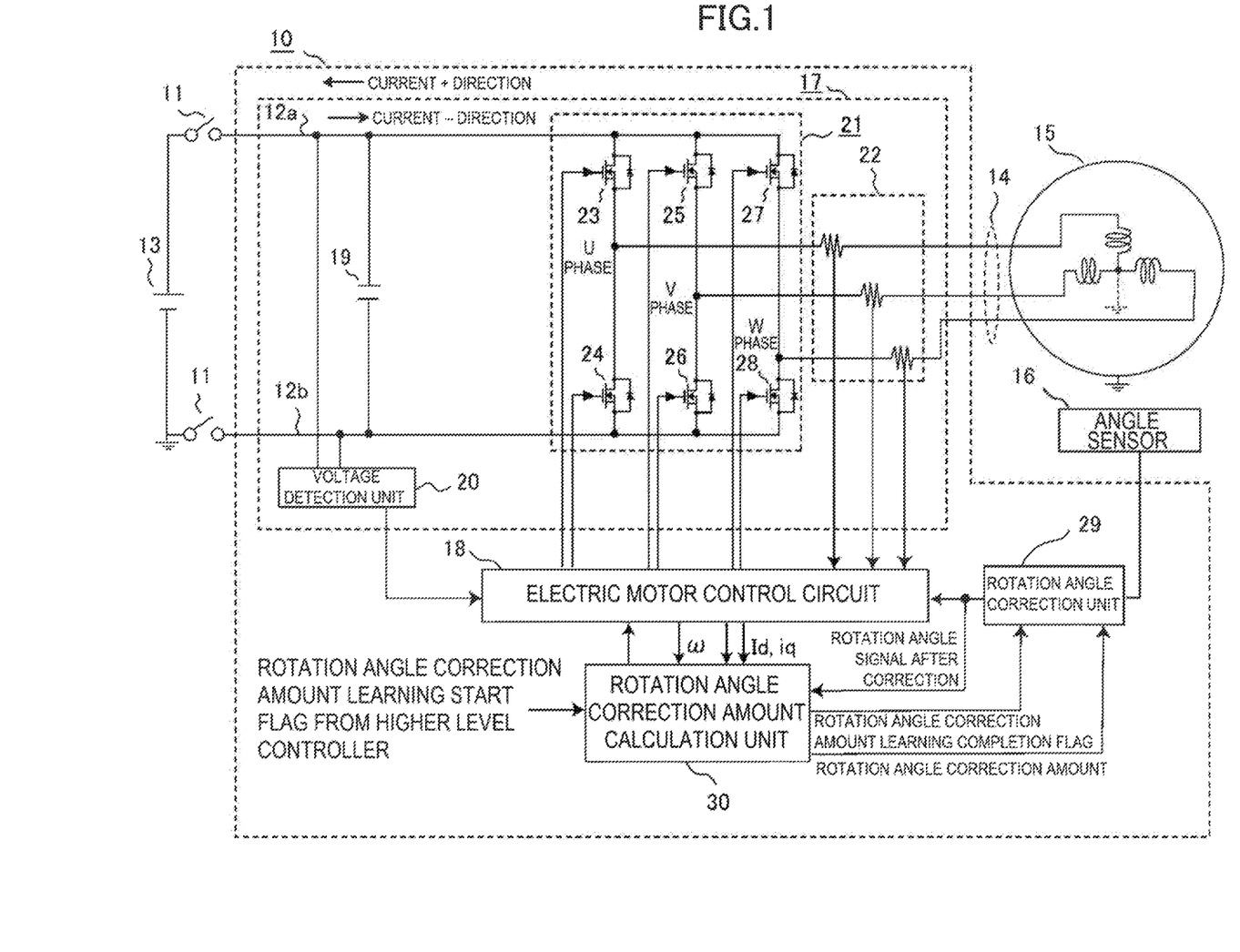
FIG. 1 is a block configuration diagram of a system including an electric motor control device according to a first embodiment.

FIG. 1 is a block configuration diagram of a system including an electric motor control device according to a first embodiment. A direct current power supply, such as a battery, that supplies direct current power to an inverter circuit and is charged by regenerative power, and an alternating current electric motor that is a control target, are included in FIG. 1.

In FIG. 1, an electric motor control device 10 is connected to a direct current power supply 13 by direct current buses 12a and 12b via a power switch 11, and receives a drive power from, and supplies regenerative power to, the direct current power supply 13. The electric motor control device 10 is connected to an alternating current electric motor 15 by an alternating current bus 14, and supplies a drive power to, and receives regenerative power from, the alternating current electric motor 15.

Also, an angle sensor 16 that detects a rotation angle of the alternating current electric motor 15 is provided in the alternating current electric motor 15. The alternating current electric motor 15 is an alternating current electric motor that drives a load so as to rotate, and can regenerate rotational energy of the load as electrical energy, wherein, for example, a permanent magnet three-phase alternating current synchronous motor or a three-phase brushless motor is used.

The electric motor control device 10 is configured of an inverter circuit 17 and an electric motor control circuit 18. The inverter circuit 17 is configured of a capacitor 19 connected between the direct current buses 12a and 12b on a power supply input side, a voltage detection unit 20 that detects a direct current bus voltage of the inverter circuit 17, and a multiple of switching elements to be described hereafter, and includes a power conversion circuit 21 that carries out a direct current/alternating current power conversion, and a current detection unit 22 that detects a current of the alternating current electric motor 15 flowing through the alternating current bus 14.

The capacitor 19 has a function of restricting a ripple of a direct current bus voltage, and a function of causing a power supply impedance of the inverter circuit 17 to decrease, thereby causing an alternating current drive capacity of the inverter circuit 17 to improve, and furthermore, a function of absorbing a surge voltage, and the like. Also, the voltage detection unit 20 divides a direct current bus voltage into voltage that can be read by the electric motor control circuit 18 using a voltage dividing resistor or the like, and outputs direct current bus voltage information to the electric motor control circuit 18.

The power conversion circuit 21 is a generally well-known inverter wherein six switching elements are full-bridge connected. That is, as shown in FIG. 1, switching elements 23 and 24, switching elements 25 and 26, and switching elements 27 and 28 are connected to each other in series, and connected in parallel to the direct current power supply 13.

Also, a midpoint of the switching elements 23 and 24 is connected to an input of a U-phase of the alternating current electric motor 15, a midpoint of the switching elements 25 and 26 is connected to an input of a V-phase of the alternating current electric motor 15, and a midpoint of the switching elements 27 and 28 is connected to an input of a W-phase of the alternating current electric motor 15.

Herein, switching elements on a positive electrode side of the direct current power supply 13, that is, the switching elements 23, 25, and 27 connected to the direct current bus 12a, are called upper level side switching elements, and switching elements on a negative electrode side of the direct current power supply 13, that is, the switching elements 24, 26, and 28 connected to the direct current bus 12b, are called lower level side switching elements.

The kind of MOSFET (metal-oxide-semiconductor field-effect transistor) shown in FIG. 1, an IGBT (insulated gate bipolar transistor), or the like, is used as the switching elements 23 to 28. A freewheeling diode is provided in parallel with each MOSFET of the switching elements 23 to 28, with a direction from the negative electrode side of the direct current power supply 13 toward the positive electrode side, that is, a direction from the lower level side toward the upper level side, as a forward direction.

The current detection unit 22 detects a motor current flowing through the alternating current bus 14, converts the current into voltage, and outputs current information for the alternating current electric motor 15 to the electric motor control circuit 18. In FIG. 1, a configuration wherein current is detected using a shunt resistor is shown. The current detection unit 22 may also be a current sensor that uses a Hall element or the like.

The power switch 11 controls a transfer of power between the direct current power supply 13 and the electric motor control device 10. Specifically, when a voltage of the direct current power supply 13 reaches a set value or greater when the alternating current electric motor 15 is carrying out a regenerative operation, when the voltage of the direct current power supply 13 drops to a set value or less due to consumption or the like of the direct current power supply 13, when a current flowing through the direct current power supply 13 reaches a set value or greater, and furthermore, when a vehicle failure or a collision is detected, or the like, the power switch 11 is controlled to an opened state by an unshown higher level system.

Also, the angle sensor 16 detects a rotor rotation angle θm of the alternating current electric motor 15 using a resolver, an encoder, or the like. The rotor rotation angle θm detected by the angle sensor 16 is output to the electric motor control circuit 18 via a rotation angle correction unit 29. The rotor rotation angle θm is converted into an electrical angle (a rotation angle corresponding to a magnetic pole position) θ based on a number of polar pairs of a permanent magnet of the alternating current electric motor 15.

The electric motor control circuit 18 governs control of the whole of the electric motor control device, and is configured of a microcontroller, a drive circuit, and the like. A rotation angle correction amount calculation unit 30 receives a rotation angle correction amount learning start flag from a higher level controller, calculates a rotation angle correction amount from a rotation angle signal after correction, which is an output from the rotation angle correction unit 29, and a current detection signal for the alternating current electric motor 15 detected by the electric motor control circuit 18, and outputs a new rotation angle correction amount to the rotation angle correction unit 29. In FIG. 1, each of the rotation angle correction unit 29 and the rotation angle correction amount calculation unit 30 is shown detached from the electric motor control circuit 18, but the rotation angle correction unit 29 and the rotation angle correction amount calculation unit 30 may be configured so as to be included in the electric motor control circuit 18.

Figure 2A:
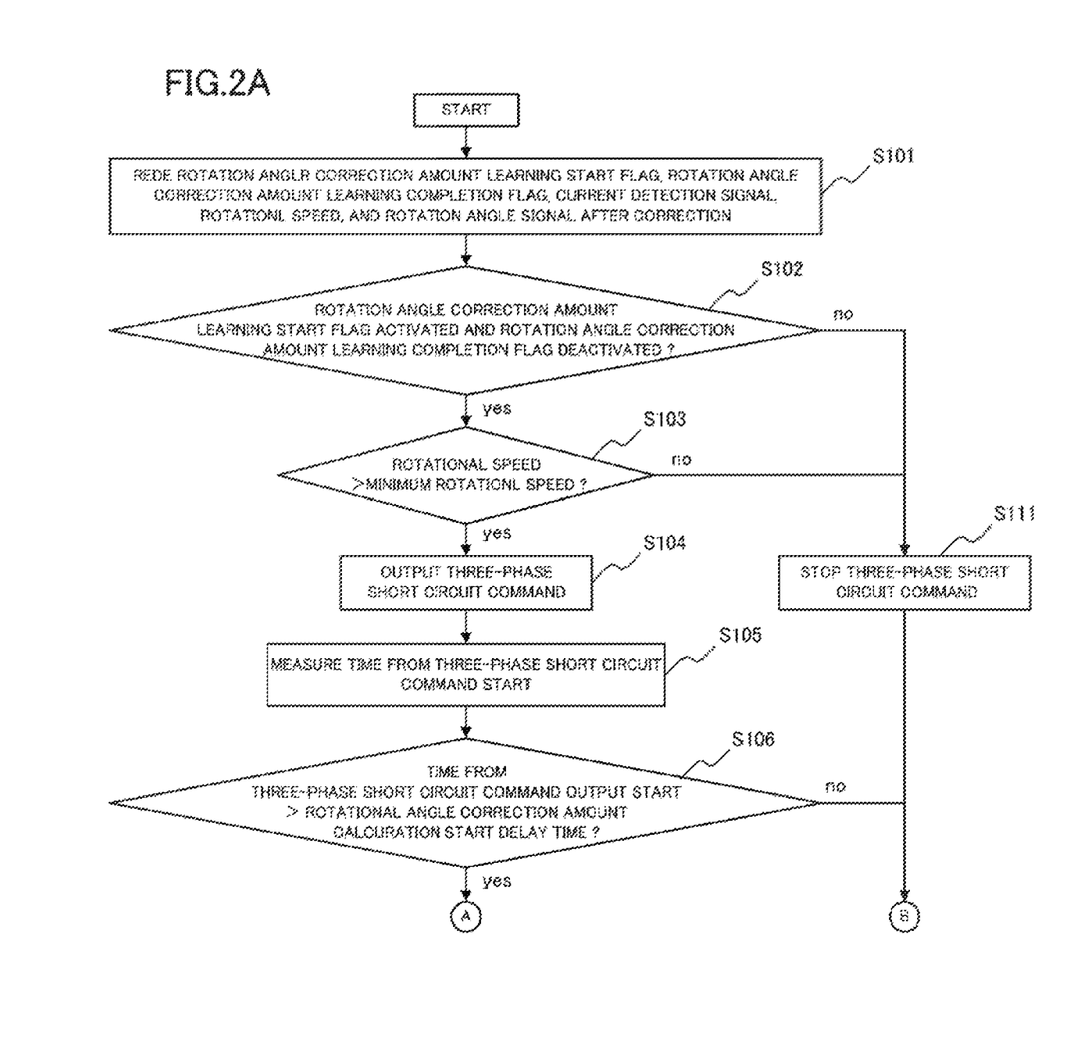
FIG. 2A is a flowchart for calculating a rotation angle correction amount in a rotation angle correction amount calculation unit of the electric motor control device according to the first embodiment.
Figure 2B:
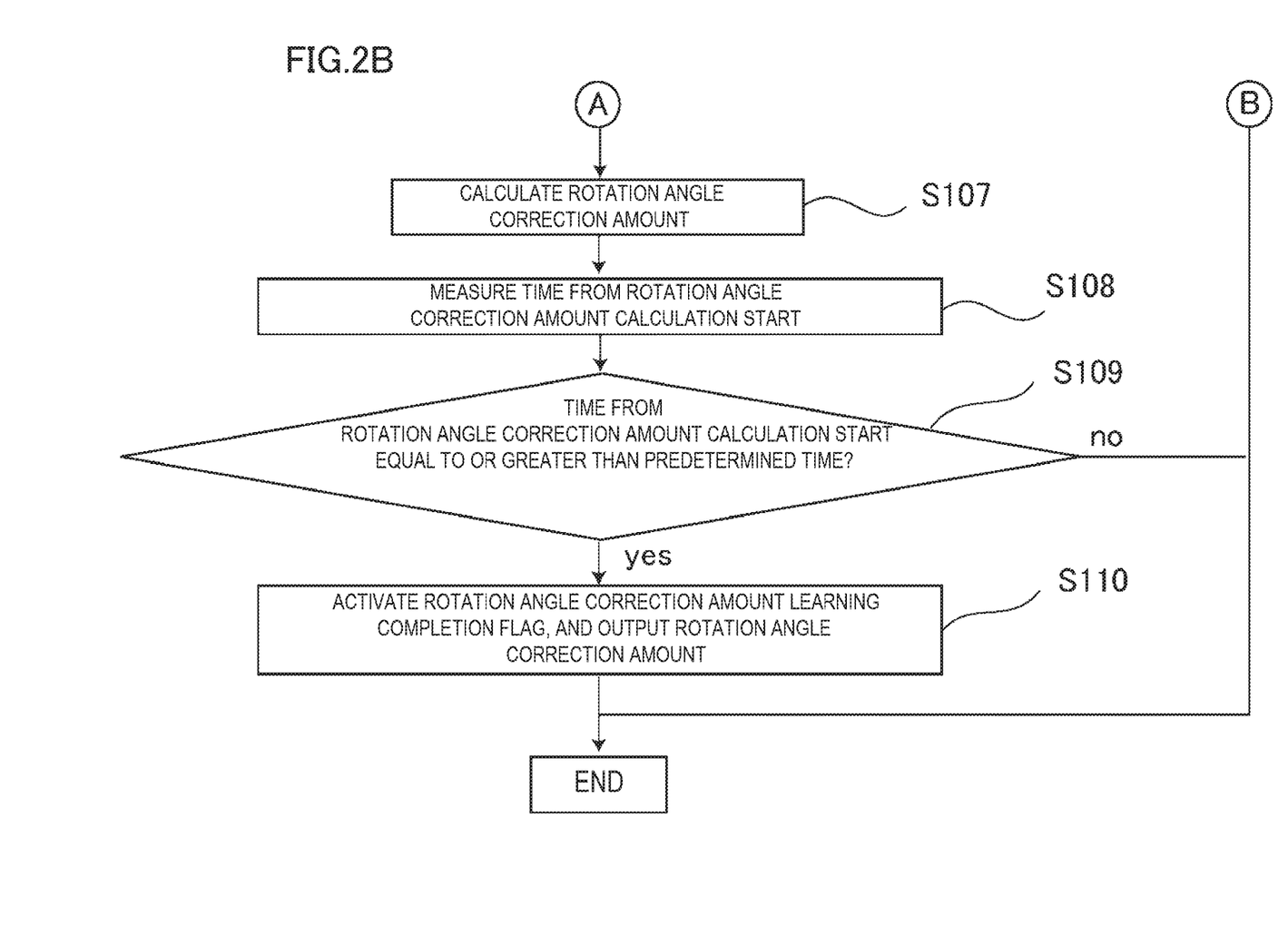
FIG. 2B is a flowchart for calculating a rotation angle correction amount in the rotation angle correction amount calculation unit of the electric motor control device according to the first embodiment.

FIG. 2A and FIG. 2B are a flowchart for a calculation of a rotation angle correction amount for the alternating current electric motor 15 executed in the rotation angle correction amount calculation unit 30, wherein, for example, the flowchart is called up in a constant cycle by the electric motor control circuit 18 configured in a microcomputer omitted from the drawings, and executed so as to repeat a series of processes. The processes in the flowchart of FIG. 2A and FIG. 2B will be described in detail hereafter.

Firstly, in step S101, the rotation angle correction amount calculation unit 30 reads a rotation angle correction amount learning start flag from the higher level controller, a rotation angle correction amount learning completion flag, a rotational speed C calculated from a rotation angle signal by the current detection signal and the electric motor control circuit 18, and a rotation angle signal after correction calculated by the rotation angle correction unit 29. When the processes of the flowchart of FIG. 2A and FIG. 2B are yet to be completed for the first time, the rotation angle signal after correction is provided with a value preset the previous time or the first time as a correction amount.

Next, in step S102, the rotation angle correction amount calculation unit 30 determines whether or not the rotation angle correction amount learning start flag is activated and the rotation angle correction amount learning completion flag is deactivated. The rotation angle correction amount calculation unit 30 proceeds to step S103 when the rotation angle correction amount learning start flag is activated and the rotation angle correction amount learning completion flag is deactivated, and proceeds to step S111 when this is not the case.

Next, in step S103, the rotation angle correction amount calculation unit 30 determines whether or not a current rotational speed is greater than a preset minimum rotational speed, proceeds to step S104 when the current rotational speed is greater than the preset minimum rotational speed, and proceeds to step S111 when this is not the case. Herein, the minimum rotational speed is a rotational speed decided on in accordance with characteristics of the alternating current electric motor 15 and a required (necessary) accuracy of the rotation angle correction amount, and a method of determining the minimum rotational speed will be described hereafter.

In step S104, the rotation angle correction amount calculation unit 30 outputs a three-phase short circuit command to the alternating current electric motor 15 (a command for a signal to be provided by the electric motor control circuit 18 to the switching elements 23 to 28 so as to cause all three phases between winding terminals to short-circuit), and proceeds to step S105.

Next, in step S105, the rotation angle correction amount calculation unit 30 measures time from a start of the three-phase short circuit command, and proceeds to step S106. In step S106, the rotation angle correction amount calculation unit 30 determines whether or not the time from the start of outputting the three-phase short circuit command is greater than a preset rotation angle correction amount calculation start delay time, proceeds to step S107 when the time from the start of outputting the three-phase short circuit command is greater than the preset rotation angle correction amount calculation start delay time, and ends the calculation process of the current calculation cycle when this is not the case. In step S107, the rotation angle correction amount calculation unit 30 calculates a rotation angle correction amount using Equation 9 or Equation 10, to be described hereafter, and proceeds to step S108. In step S108, the rotation angle correction amount calculation unit 30 measures time from a start of calculating the rotation angle correction amount, and proceeds to step S109.

In step S109, the rotation angle correction amount calculation unit 30 determines whether or not the time from the start of calculating the rotation angle correction amount is equal to or greater than a predetermined time, proceeds to step S110 when the time from the start of calculating the rotation angle correction amount is equal to or greater than the predetermined time, and ends the calculation process of the current calculation cycle when this is not the case. A method of determining the predetermined time in step S109 will be described hereafter.

In step S110, the rotation angle correction amount calculation unit 30 activates the rotation angle correction amount learning completion flag, outputs the rotation angle correction amount to the rotation angle correction unit 29, and ends the process. In step S111, the rotation angle correction amount calculation unit 30 stops the three-phase short circuit command, thereby ending the calculation process of the current calculation cycle.

Figure 3:
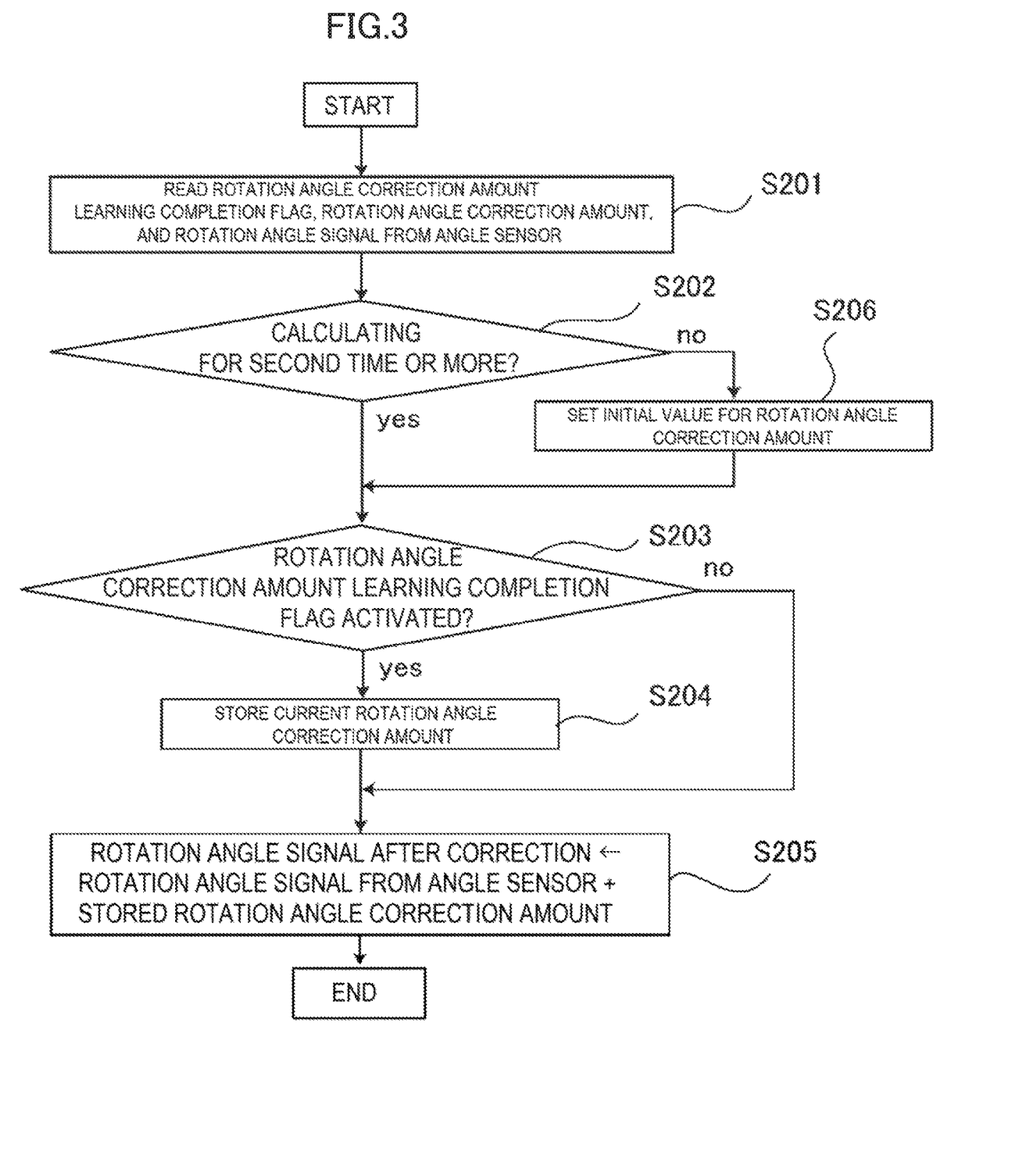
FIG. 3 is a flowchart for calculating a rotation angle signal after correction in a rotation angle correction unit of the electric motor control device according to the first embodiment.

FIG. 3 is a flowchart for a calculation of a rotation angle signal after correction in the rotation angle correction unit 29, wherein, for example, a configuration is such that the flowchart is called up in a constant cycle by the electric motor control circuit 18 configured in a microcomputer omitted from the drawings, and a process is repeated. The process in the flowchart of FIG. 3 will be described in detail hereafter.

The rotation angle correction unit 29 receives a rotation angle correction amount learning completion flag from the rotation angle correction amount calculation unit 30, a rotation angle correction amount, and a rotation angle signal from the angle sensor 16, and outputs a rotation angle signal after correction.

In the flowchart of FIG. 3, firstly, the rotation angle correction unit 29 reads a rotation angle correction amount learning completion flag from the rotation angle correction amount calculation unit 30, a rotation angle correction amount, and a rotation angle signal from the angle sensor 16 in step S201.

Next, the rotation angle correction unit 29 proceeds to step S203 provided that it is determined in step S202 that the calculation of the flowchart of FIG. 3 is being carried out for the second time or more since the electric motor control device 10 started operating, and proceeds to step S206 when this is not the case. In step S206, the rotation angle correction unit 29 sets an initial value for the rotation angle correction amount, and proceeds to step S203. In step S203, the rotation angle correction unit 29 determines whether or not the rotation angle correction amount learning completion flag is activated, proceeds to step S204 provided that the rotation angle correction amount learning completion flag is activated, and proceeds to step S205 when this is not the case. In step S204, the rotation angle correction unit 29 stores the current rotation angle correction amount, and proceeds to step S205. In step S205, the rotation angle correction unit 29 adopts a value that is the stored rotation angle correction amount added to the rotation angle signal from the angle sensor 16 as a rotation angle signal after correction, and outputs the rotation angle signal after correction to the electric motor control circuit 18 and the rotation angle correction amount calculation unit 30, thereby ending the calculation process of the calculation cycle.

Figure 4:
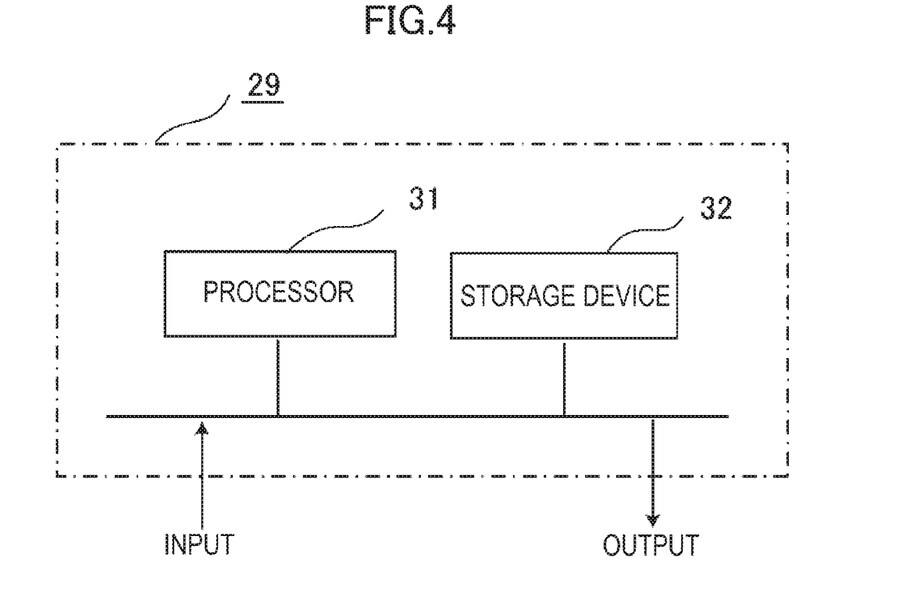
FIG. 4 is a drawing showing an example of a hardware configuration of the rotation angle correction unit of the electric motor control device according to the first embodiment.

The rotation angle correction unit 29 is configured of a processor 31 and a storage device 32, as shown in a hardware example in FIG. 4. Although not shown in the drawing, the storage device 32 includes a volatile storage device such as a random access memory and a non-volatile auxiliary storage device such as a flash memory. Also, the storage device 32 may include a hard disk auxiliary storage device instead of a flash memory. The processor 31 executes a program input from the storage device 32. In this case, the program is input from the auxiliary storage device into the processor 31 via the volatile storage device. Also, the processor 31 may output data such as a calculation result to the volatile storage device of the storage device 32, or may save the data in the auxiliary storage device via the volatile storage device. Also, the rotation angle correction amount calculation unit 30 is configured of the same kind of hardware as the rotation angle correction unit 29.

Next, a principle whereby a rotation angle correction amount can be calculated with high accuracy in this embodiment will be described, in addition to which a method of determining the minimum rotational speed in step S103 and a method of determining the predetermined time in step S109 will be described. Although a three-phase permanent magnet synchronous electric motor will be described below, a multi-phase electric motor of other than three phases may be adopted. Also, an electric motor other than a permanent magnet type may be adopted, provided that the electric motor is an electric motor wherein current flows when a short circuit is caused between winding terminals of an alternating current electric motor.

With a direction of a north pole of the alternating current electric motor 15 is taken to be a d-axis, a direction perpendicular to the d-axis is taken to be a q-axis, and a rotation angle signal after correction is considered to coincide with a magnetic pole position of the alternating current electric motor 15, the electric motor control circuit 18 converts to a dq coordinate system using the rotation angle signal after correction, and calculates terminal voltages vd and vq of the alternating current electric motor 15 and armature currents id and iq of the alternating current electric motor 15.

Hereafter, assuming a state wherein a rotation angle signal after correction and a magnetic pole position of the alternating current electric motor 15 coincide perfectly, a description will be given using a voltage equation of the alternating current electric motor 15 converted into the dq coordinate system. Herein, Equation 1 is a voltage equation of the alternating current electric motor 15 converted into the dq coordinate system. In Equation 1, v is an electric motor winding terminal voltage, i is an armature current, p is a differential operator, ω is a rotor rotational angular speed (rotational speed), φ is a counter electromotive force constant, R is electric motor winding resistance, L is electric motor winding inductance, and subscripts d and q are d-axis and q-axis components of each amount.

Math. 1

$$\left\{ \begin{matrix} v_d \\ v_q \end{matrix} \right\} = \begin{bmatrix} R + pL_d & -\omega L_q \\ \omega L_d & R + pL_q \end{bmatrix} \cdot \left\{ \begin{matrix} i_d \\ i_q \end{matrix} \right\} + \left\{ \begin{matrix} 0 \\ \omega \phi \end{matrix} \right\} \quad (1)$$

When a short circuit is caused between the winding terminals of the alternating current electric motor 15, the terminal voltages vd and vq of the alternating current electric motor 15 become zero. Also, in a state equal to or greater than a time constant of a winding of the alternating current electric motor 15 (for example, a value calculated by the inductance L of the electric motor winding/the resistance R of the electric motor winding), and in which the rotational speed is high, the d and q-axis component currents when a short circuit is caused between the winding terminals of the alternating current electric motor 15 become practically constant, because of which Equation 1 can be expressed as in Equation 2.

Math. 2

$$\begin{bmatrix} -R & \omega L_q \\ -\omega L_d & -R \end{bmatrix} \cdot \begin{Bmatrix} i_d \\ i_q \end{Bmatrix} = \begin{Bmatrix} 0 \\ \omega \phi \end{Bmatrix} \quad (2)$$

The armature currents id and iq when a short circuit is caused between the winding terminals of the alternating current electric motor 15 obtained from Equation 2 are as in Equation 3.

Math. 3

$$\begin{Bmatrix} i_d \\ i_q \end{Bmatrix} = \frac{1}{R^2 + \omega^2 \cdot L_d \cdot L_q} \cdot \begin{bmatrix} -R & -\omega L_q \\ \omega L_d & -R \end{bmatrix} \cdot \begin{Bmatrix} 0 \\ \omega \phi \end{Bmatrix} =$$

$$\frac{-\omega \cdot L_d \cdot L_q}{R^2 + \omega^2 \cdot L_d \cdot L_q} \cdot \frac{\phi}{L_d} \cdot \begin{Bmatrix} \omega \\ R \\ L_q \end{Bmatrix} = \frac{-\omega^2 \cdot L_d \cdot L_q}{R^2 + \omega^2 \cdot L_d \cdot L_q} \cdot \frac{\phi}{L_d} \cdot \begin{Bmatrix} 1 \\ R \\ \omega \cdot L_q \end{Bmatrix} \quad (3)$$

From Equation 3, it is seen that when the rotational angular speed (rotational speed) ω of the alternating current electric motor 15 such that ω>>(R/Lq) is fulfilled is a sufficiently high rotational speed, id=−φ/Ld and iq=0 are fulfilled, because of which a current phase in the dq coordinate system asymptotically approaches the d-axis. A current phase obtained from the armature current of Equation 3 with a magnetic pole position (the d-axis direction) as a reference is as in Equation 4. It is understood that when the rotational angular speed (rotational speed) ω of the alternating current electric motor 15 is sufficiently high with respect to R/Lq, a phase θcur of the armature current coincides with the d-axis direction (in the embodiment, attention should be paid to the point that when ω increases, the armature currents id and iq are multiplied by −1 so that the angle of Equation 4 coincides with the d-axis at 0 degrees). When the resistance R, the inductance Lq, and the rotational angular speed (rotational speed) ω of the winding of the alternating current electric motor 15 are measured, or known to a certain degree of accuracy owing to prior analysis or the like, R/(ω·Lq) of Equation 4 can be calculated directly, and a deviation between the current phase and the d-axis can be calculated, even when the rotational angular speed (rotational speed) ω is low.

Math. 4

$$\theta cur = a \tan 2(-id, -iq) = a \tan 2(-1, -R/(\omega \cdot Lq)) \quad (4)$$

Current detection signals iu, iv, and iw detected by the current detection unit 22 are calculated as d and q-axis currents idc and iqc in the electric motor control circuit 18 from a coordinate conversion of Equation 5, using a rotation angle signal θc from the angle sensor 16.

Math. 5

$$\begin{bmatrix} i_{dc} \\ i_{qc} \end{bmatrix} = \sqrt{\frac{2}{3}} \begin{bmatrix} \cos\theta_c & \cos\left(\theta_c - \frac{2}{3}\pi\right) & \cos\left(\theta_c + \frac{2}{3}\pi\right) \\ -\sin\theta_c & -\sin\left(\theta_c - \frac{2}{3}\pi\right) & -\sin\left(\theta_c + \frac{2}{3}\pi\right) \end{bmatrix} \begin{bmatrix} i_u \\ i_v \\ i_w \end{bmatrix} \quad (5)$$

A phase θcur' of the d and q-axis currents in the electric motor control circuit 18 is calculated in Equation 6 using the same kind of calculation as in Equation 4.

Math. 6

$$\theta cur' = a \tan 2(-idc, -iqc) \quad (6)$$

When an origin of the rotation angle signal θc from the angle sensor 16 deviates by Δθ from the magnetic pole position (the d-axis direction), θcur'=θcur+Δθ. From this, it is understood that the deviation Δθ of the origin of the rotation angle signal θc from the angle sensor 16 is obtained in Equation 7 using Equation 4 and Equation 6.

Math. 7

$$\Delta\theta = \theta cur' - \theta cur \quad (7)$$
$$= \mathrm{atan2}(-idc, -iqc) - \mathrm{atan2}(-1, -R/(\omega \cdot Lq))$$

It is understood that when the phase θcur' of the d and q-axis currents in the electric motor control circuit 18 is corrected in Equation 8, with a rotation angle correction amount θcomp being −Δθ, the magnetic pole position of the alternating current electric motor 15 can be calculated.

Math. 8

$$\theta cur = \theta cur' + \theta comp = \theta cur' - \Delta\theta \quad (8)$$

In this embodiment, the aforementioned θcomp (corresponding to Δθ) is calculated as the rotation angle correction amount in step S107 of the flowchart of FIG. 2A and FIG. 2B.

Next, a method of determining the minimum rotational speed in step S103 and a method of determining the predetermined time in step S109 will be described.

Figure 5A:
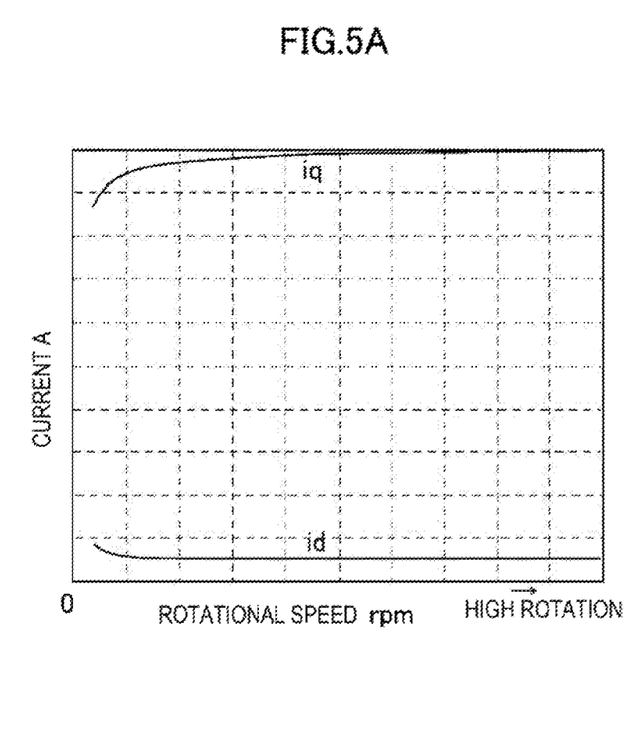
FIG. 5A and FIG. 5B are drawing showing a current phase of an alternating current electric motor controlled by the electric motor control device according to the first embodiment.
Figure 5B:
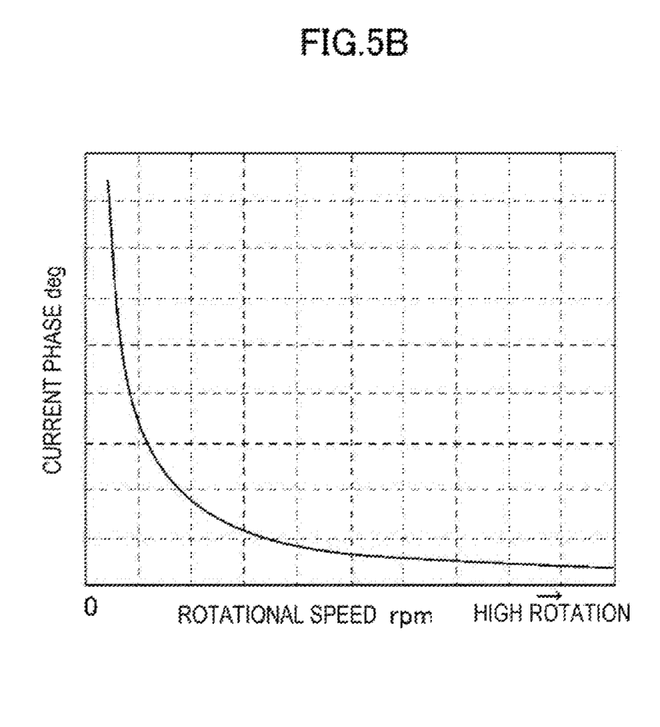

The armature currents id and iq in the alternating current electric motor 15 obtained from Equation 3 are shown in FIG. 5A, and the current phase obtained from Equation 4 is shown in FIG. 5B. It is understood from FIG. 5A that the armature current iq becomes larger the higher the rotational speed, while the armature current id becomes a constant value. Also, FIG. 5B shows that the current phase becomes nearer to zero (the d-axis) the higher the rotational speed, and a difference between the current phase and the d-axis (0 degrees on a vertical axis of FIG. 5B corresponds to the d-axis) becomes a small value of two degrees or less. This means that by fixing the rotational speed so that a phase difference between the phase of the armature current and the d-axis direction is of a predetermined value or lower, the deviation from the d-axis direction can be calculated with a predetermined angular accuracy, as in Equation 9 and Equation 10, regardless of a value of the resistance R or the inductance Lq of the winding of the alternating current electric motor 15.

Math. 9

$$\Delta comp = -\Delta\theta = -\theta cur' - \theta cur \quad (9)$$
$$= -\mathrm{atan2}(-idc, -iqc) + \mathrm{atan2}(-1, -R/(\omega \cdot Lq))$$

When the rotational speed is sufficiently high, $$\theta comp = -\Delta\theta \approx -a \tan 2(-idc, -iqc) \quad (10)$$

This means that by setting the minimum rotational speed in step S103 of the flowchart of FIG. 2A and FIG. 2B so as to be a rotational speed sufficiently higher than R/Lq, or more specifically, by setting the minimum rotational speed so that the angle error calculated in Equation 4 is of a predetermined value or less, the d-axis direction angle can be calculated with high accuracy, whereby a deviation between the origin of the rotation angle signal θ from the angle sensor 16 of the alternating current electric motor 15 and a magnetic pole position origin (the d-axis direction) can be calculated with high accuracy.

Figure 6:
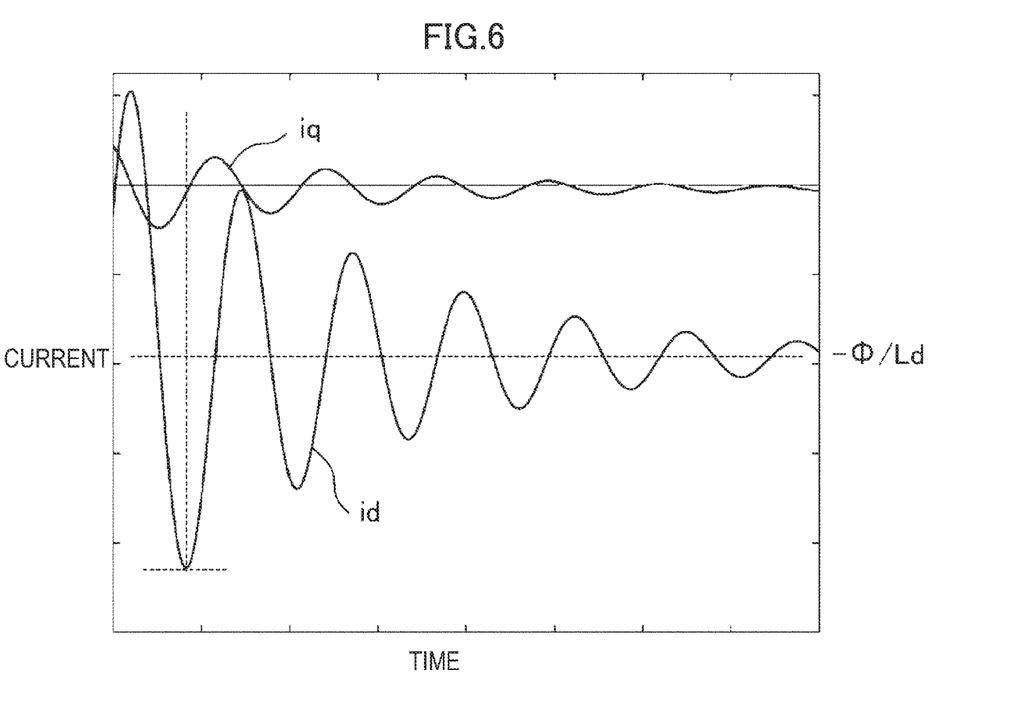
FIG. 6 is a drawing showing a current when a short circuit is caused between winding terminals of the alternating current electric motor controlled by the electric motor control device according to the first embodiment.

When causing the winding terminals to short-circuit while the alternating current electric motor 15 is rotating, current vibration occurs in the armature currents id and iq, as shown in FIG. 6. When the armature currents id and iq are vibrating, accuracy of calculating the rotation angle correction amount deteriorates. As is understood from FIG. 6, the vibration of the armature currents id and iq is attenuated with the elapse of time, because of which the rotation angle correction amount can be calculated with high accuracy by calculating the current phase in accordance with the flowchart of FIG. 2A and FIG. 2B after waiting until the vibration of the armature currents id and iq is sufficiently attenuated.

It is understood that it is sufficient to set the rotation angle correction amount calculation start delay time in step S106 in the flowchart of FIG. 2A and FIG. 2B to a time until current vibration is attenuated in the armature currents id and iq.

As the value of the resistance R of the alternating current electric motor 15 changes in accordance with temperature, an error in calculating the rotation angle correction amount can be reduced provided that a value of the resistance R corrected in accordance with temperature is used in Equation 9.

Also, it is known that the value of the inductance of the alternating current electric motor 15 changes due to an effect of magnetic saturation caused by current flowing through the alternating current electric motor 15. Because of this, an error in the rotation angle correction amount can be reduced by using inductance Lq changed in accordance with a value of current flowing through the alternating current electric motor 15 in Equation 9. The inductance Lq in accordance with the value of current flowing through the alternating current electric motor 15 may be stored in the microcomputer as table data, or calculated from an approximation function.

As factors in a rotation angle correction amount calculation error increasing in size, there are factors such as a phase delay of a current sensor including the circuit used for the current detection unit 22, a phase delay of a current sensor filter, a phase delay of an angle sensor signal, or a phase delay of a filter of the angle sensor 16. Because of this, an angle that compensates for the delays is added to the rotation angle correction amount of step S106 of the flowchart of FIG. 2A and FIG. 2B so as to compensate for the phase delays, whereby a rotation angle correction amount calculation error can be reduced in size. The phase delay of the current sensor, the phase delay of the current sensor filter, the phase delay of the angle sensor signal, and the phase delay of the filter of the angle sensor 16 may be stored in the microcomputer as table data, or calculated from an approximation function.

In this embodiment, a rotation angle correction amount is stored based on a rotation angle correction amount learning completion flag, as described in the flowchart of FIG. 3. Because of this, phase information on a value of current detected at a predetermined rotational speed or greater is stored, because of which an increase in rotation angle correction amount calculation errors caused by the rotational speed being low can be prevented.

It is necessary for the electric motor control device 10 of this embodiment to cause the alternating current electric motor 15 to rotate at a predetermined rotational speed or greater in order to calculate a rotation angle correction amount. As one method thereof, for example, the electric motor control device 10 raises the alternating current electric motor 15 to a predetermined rotational speed or greater by controlling the speed thereof, after which the electric motor control device 10 can switch the winding terminals to a short-circuited state.

At this time, in order to execute the flowchart of FIG. 2A and FIG. 2B after the winding terminals are switched to a short-circuited state, it is necessary to determine whether or not a load torque acting on a rotary shaft of the alternating current electric motor 15 is of a magnitude such as to cause the rotational speed to decrease significantly, so that the rotational speed does not drop significantly.

In this embodiment, the load torque acting on the rotary shaft of the alternating current electric motor 15 is estimated from the torque or the current when the rotational speed of the alternating current electric motor 15 is controlled to a constant speed, and when the load torque is of a predetermined value or less, it is determined that the drop in rotational speed after the winding terminal short-circuiting is small, and the angle deviation amount calculation shown in the flowchart of FIG. 2A and FIG. 2B is implemented. By so doing, an increase in the rotation angle correction amount can be prevented, even when the resistance R and the inductance Lq of the electric motor winding, which form motor parameters of the alternating current electric motor 15, are not accurately known.

In this embodiment, an overcurrent may, depending on operating conditions, be generated in the electric motor control device 10 immediately after the winding terminals of the alternating current electric motor 15 are switched to a short-circuited state. It is understood that a magnitude of a current peak at the instant at which the winding terminals of the alternating current electric motor 15 are short-circuited is decided using Equation 1 in accordance with the terminal voltages vd and vq of the alternating current electric motor 15 before switching to the short-circuited state.

Because of this, the armature current iq of the alternating current electric motor 15 before short-circuiting is brought as close as possible to zero, and the armature current id is caused to flow in a negative direction so as to approach $-\phi/Ld$, whereby a voltage $\omega\phi$ generated by a permanent magnet flux $\phi$ can be brought close to zero, and the terminal voltages vd and vq of the alternating current electric motor 15 before short-circuiting can be brought close to zero. Because of this, an overcurrent generated immediately after the winding terminals of the alternating current electric motor 15 are switched to a short-circuited state can be reliably prevented. Also, by deactivating an overcurrent detection diagnosis and a stopping function before short-circuiting the winding terminals of the alternating current electric motor 15, then switching to a short-circuited state, short-circuiting caused by an overcurrent can be more reliably prevented.

A calculation of a direct current component rotation angle correction amount has been shown in this embodiment, but provided that phases of the armature currents id and iq of the alternating current electric motor 15 are used, a rotation angle correction amount of an alternating current component included in a rotation angle signal from the angle sensor 16 can also be calculated. Because of this, a rotation angle correction amount used in a phase correction of a rotation angle signal from the angle sensor 16 can be calculated with high accuracy. Also, by an alternating current component rotation angle correction amount being added to a last-calculated rotation angle signal after correction, the accuracy of the rotation angle signal after correction can be increased.

Heretofore, the first embodiment has been described in detail, but another embodiment is such that by switching in accordance with the rotational speed between a method whereby a rotation angle correction amount is calculated from a current phase when short-circuiting the winding terminals of the alternating current electric motor 15 shown in the first embodiment and a method whereby the inverter circuit 17 is controlled so that the armature currents of the alternating current electric motor 15 are maintained at id=0 and iq=0, and a rotation angle correction amount is calculated from phases of voltage commands vd' and vq' used in a control of the alternating current electric motor 15 at the time (in Equation 1, vd=0 and vq=ωϕ, and a phase difference between a rotation angle signal from the angle sensor, a phase of induced electromotive force when the electric motor is not energized, and a phase of a magnetic pole position detection signal generated by a magnetic pole position sensor is obtained from atan 2 (vd, vq)), the rotation angle correction amount can be calculated accurately using the voltage commands vd' and vq', even at a time of low rotation wherein a short-circuit current is small.

Although the present application is described in terms of an exemplifying embodiment, the various features, aspects, and functions described in the embodiment are not limited in their applicability to a specific embodiment, but instead can be applied, alone or in various combinations, to other embodiments.

It is therefore understood that numerous modifications that have not been exemplified can be devised without departing from the scope of the technology disclosed in the present application. For example, at least one constituent component may be modified, added, or eliminated.

REFERENCE SIGNS LIST 10 electric motor control device, 11 power switch, 12a, 12b direct current bus, 13 direct current power supply, 14 alternating current bus, 15 alternating current electric motor, 16 angle sensor, 17 inverter circuit, 18 electric motor control circuit, 19 capacitor, 20 voltage detection unit, 21 power conversion circuit, 22 current detection unit, 23, 24, 25, 26, 27, 28 switching element, 29 rotation angle correction unit, 30 rotation angle correction amount calculation unit, 31 processor, 32 storage device, i, id, iq armature current, iu, iv, iw current detection signal, idc, iqc dq-axis current, θm rotor rotation angle, θc rotation angle signal, θcomp rotation angle correction amount, θcur armature current phase, θcur' dq-axis current phase, L, Lq inductance, ω rotational angular speed (rotational speed), R electric motor winding resistance, v, vd, vq terminal voltage, vd', vq' voltage command.

The invention claimed is:

1. An electric motor control device, comprising:
an electric motor control circuit that controls an inverter that supplies power to an alternating current electric motor, and into which a rotation angle signal for the alternating current electric motor output from an angle sensor and a current detection signal for the alternating current electric motor output from a detector are input;
a rotation angle correction amount calculator that, based on the rotation angle signal and the current detection signal, calculates a rotation angle correction amount to correct a rotation angle error between the rotation angle signal and a magnetic pole position of the alternating current electric motor; and
a rotation angle corrector that stores the rotation angle correction amount calculated by the rotation angle correction amount calculator, reads the stored rotation angle correction amount, and corrects the rotation angle signal, wherein
the control device carries out a control of the alternating current electric motor based on the rotation angle signal corrected by the rotation angle corrector, and
the rotation angle correction amount calculator, based on a current detection signal when a short circuit is caused between winding terminals of the alternating current electric motor, calculates at least either one rotation angle correction amount of a direct current component rotation angle correction amount and an alternating current component rotation angle correction amount,
wherein the at least either one rotation angle correction amount of a direct current component rotation angle correction amount and an alternating current component rotation angle correction amount is calculated from current detection signal phase information at a time after a time constant decided on in accordance with characteristics of the alternating current electric motor elapses from a time at which a short circuit between the winding terminals of the alternating current electric motor starts.

2. The electric motor control device according to claim 1, wherein a current phase correction amount is added to phase information of the current detection signal.

3. The electric motor control device according to claim 2, wherein the current phase correction amount is calculated using a resistance value and an inductance value of the alternating current electric motor.

4. The electric motor control device according to claim 3, wherein the resistance value is corrected in accordance with a temperature of the alternating current electric motor.

5. The electric motor control device according to claim 4, wherein the inductance value is changed in accordance with the current detection signal.

6. The electric motor control device according to claim 3, wherein the inductance value is changed in accordance with the current detection signal.

7. The electric motor control device according to claim 2, wherein the detector is configured of a current sensor, and the phase information is compensated for by adding a phase delay of the current detection signal, a phase delay of a filter of the current sensor, a phase delay of the rotation angle signal, and a phase delay of a filter of the angle sensor.

8. The electric motor control device according to claim 7, wherein at least one of the rotation angle correction amount, the phase delay of the current detection signal, the phase delay of the filter of the current sensor, the phase delay of the rotation angle signal, and the phase delay of the filter of the angle sensor is compensated for by referring to table data.

9. The electric motor control device according to claim 1, wherein the detector is configured of a current sensor, and the phase information is compensated for by adding a phase delay of the current detection signal, a phase delay of a filter of the current sensor, a phase delay of the rotation angle signal, and a phase delay of a filter of the angle sensor.

10. The electric motor control device according to claim 9, wherein at least one of the rotation angle correction amount, the phase delay of the current detection signal, the phase delay of the filter of the current sensor, the phase delay of the rotation angle signal, and the phase delay of the filter of the angle sensor is compensated for by referring to table data.

11. The electric motor control device according to claim 1, wherein the rotation angle correction amount is calculated using a current phase obtained from a current coordinate-converted into a rotation coordinate system synchronous with the rotation angle signal.

12. The electric motor control device according to claim 1, wherein the rotation angle correction amount is calculated using current detection signal phase information at a time of a predetermined rotational speed or greater, and stored.

13. The electric motor control device according to claim 1, wherein the rotation angle correction amount is stored when a torque or a current when rotational speed is controlled to a constant speed is of a predetermined value or less.

14. The electric motor control device according to claim 1, wherein a short circuit is caused between the winding terminals of the alternating current electric motor after a voltage between the winding terminals of the alternating current electric motor drops to a predetermined value or less.

15. The electric motor control device according to claim 1, wherein a method whereby a rotation angle correction amount is calculated from voltage information of the alternating current electric motor and a method whereby a rotation angle correction amount is calculated from current information of the alternating current electric motor are switched between in accordance with the rotational speed of the alternating current electric motor.

16. The electric motor control device according to claim 1, wherein the rotation angle correction amount is calculated using a current phase obtained from a current coordinate-converted into a rotation coordinate system synchronous with the rotation angle signal.

17. The electric motor control device according to claim 1, wherein the rotation angle correction amount is calculated using current detection signal phase information at a time of a predetermined rotational speed or greater, and stored.

18. The electric motor control device according to claim 1, wherein the rotation angle correction amount is stored when a torque or a current when rotational speed is controlled to a constant speed is of a predetermined value or less.

19. An electric motor control device, comprising:
an electric motor control circuit that controls an inverter that supplies power to an alternating current electric motor, and into which a rotation angle signal for the alternating current electric motor output from an angle sensor and a current detection signal for the alternating current electric motor output from a detector are input;
a rotation angle correction amount calculator that, based on the rotation angle signal and the current detection signal, calculates a rotation angle correction amount to correct a rotation angle error between the rotation angle signal and a magnetic pole position of the alternating current electric motor; and
a rotation angle corrector that stores the rotation angle correction amount calculated by the rotation angle correction amount calculator, reads the stored rotation angle correction amount, and corrects the rotation angle signal, wherein
the control device carries out a control of the alternating current electric motor based on the rotation angle signal corrected by the rotation angle corrector, and
the rotation angle correction amount calculator, based on a current detection signal when a short circuit is caused between winding terminals of the alternating current electric motor, calculates at least either one rotation angle correction amount of a direct current component rotation angle correction amount and an alternating current component rotation angle correction amount,
wherein an interrupting operation caused by an overcurrent detection is stopped before a short circuit is caused between the winding terminals of the alternating current electric motor.

\* \* \* \* \*